United States Patent [19]

Arita et al.

[11] Patent Number: 4,742,575

[45] Date of Patent: May 3, 1988

[54] LIGHT SIGNAL TRANSMISSION/RECEPTION SYSTEM

[75] Inventors: Setsuo Arita; Tetsuo Ito, both of Hitachi, Japan

[73] Assignee: Hitachi, Ltd., Tokyo, Japan

[21] Appl. No.: 719,909

[22] Filed: Apr. 4, 1985

[30] Foreign Application Priority Data

Apr. 4, 1984 [JP] Japan ................................. 59-65774

[51] Int. Cl.⁴ .............................................. H04B 9/00
[52] U.S. Cl. .................................. 455/608; 358/174;
455/617; 455/618; 455/619
[58] Field of Search ............... 455/619, 617, 618, 606, 455/607, 608, 612, 70; 375/98; 358/174, 176, 178

[56] References Cited

U.S. PATENT DOCUMENTS

| | | | |
|---|---|---|---|
| 2,254,204 | 9/1941 | Blumlein | 358/176 |
| 2,268,811 | 1/1942 | Fewings et al. | 358/176 |
| 4,070,572 | 1/1978 | Summerhayes | 455/619 |
| 4,249,264 | 2/1981 | Crochet et al. | 455/617 |
| 4,271,503 | 6/1981 | Eumurian et al. | 455/619 |
| 4,317,235 | 2/1982 | Tsukada | 455/608 |
| 4,574,249 | 3/1986 | Williams | 455/619 |

FOREIGN PATENT DOCUMENTS 0215136 12/1984 Japan ................................. 455/617

*Primary Examiner*—Joseph A. Orsino, Jr.
*Attorney, Agent, or Firm*—Antonelli, Terry & Wands

[57] ABSTRACT

A light signal transmission/reception system which is provided, at the side of a transmitter for converting an electrical signal into a light signal and transmitting the converted light signal, with an inserting unit for inserting reference pulse signals onto the electrical signal; and is provided, at the side of a receiver, with a unit for deriving the amount of change in the reference pulse signals; unit for compensating for the magnitude of a received signal in accordance with the amount of the change; and a unit for removing the reference pulse signals from the compensated and received signal.

4 Claims, 8 Drawing Sheets

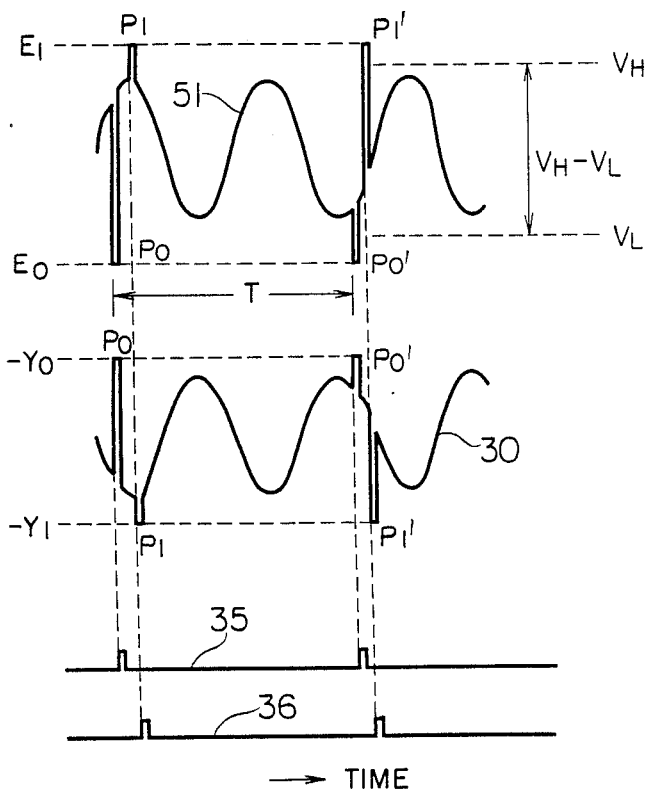
FIG. 7A
FIG. 7B
FIG. 7C
FIG. 7D
FIG. 7E
→ TIME
FIG. 8
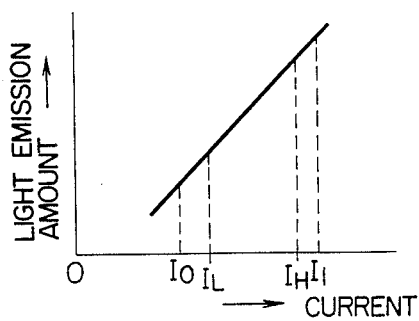

LIGHT SIGNAL TRANSMISSION/RECEPTION SYSTEM

BACKGROUND OF THE INVENTION

The present invention relates to a light signal transmission/reception system, and more particularly to a light signal transmission/reception system suitable for transmitting a transmission signal with a high precision.

Generally, in order to avoid various adverse effects caused by noises in signal transmission, an optical data transmission using as a transmission line an optical fiber cable has been adopted as a countermeasure for such noises.

In a light transmission, however, the amount of light emission from a light emission diode for converting an electrical signal into a light signal is under the influence of temperature as shown in FIG. 1. In particular, even if the current flowing into the light emission diode is maintained constant, the amount of light emission is decreased with the temperature rise. In order to compensate for this, a method shown in FIG. 2 has been adopted heretofore. This compensation method will briefly be described.

An electrical analog signal applied to a terminal 1 is inputted to a driver circuit 2 of a transmitter 6. The driver circuit 2 adjusts the amplitude of the analog signal, and the adjusted signal is outputted to a light emission diode 3. Ordinarily, the light emission diode 3 is used in such a region as the input electrical signal and the light emission amount of the light emission diode 3 become proportionate with each other. In this manner, the light emission diode 3 converts the input electrical signal into a light signal. The converted light signal is transmitted through an optical fiber cable 5 to a receiver 10.

In the receiver 10, the input light signal is converted at a light reception diode 7 into an electrical signal. The level of the electrical signal is converted at an amplifier circuit 8 to output an electrical analog signal at a terminal 9.

However, in this case, the light emission diode 3 in the transmitter 6 is under the influence of temperature, as shown in FIG. 1. Thus, in order to compensate for such influence, a portion of the light signal transmitted from the light emission diode 3 to the optical fiber cable 5 is received at a monitoring light reception diode 4 to feedback the received light signal to the driver circuit 2, thereby controlling the driver signal to the driver circuit 2. In particular, as the light emission amount decreases with the temperature rise, an electrical signal or current supplied to the light emission diode 3 from the driver circuit 2 is rendered to increase owing to the above feedback effect, so that the light emission amount of the light emission diode 3 can always be maintained constant.

If there is a temperature difference between the transmitter 6 and receiver 10, the difference however can not be compensated. The signal transmission apparatus, disclosed in the Official Gazette of Japanese Patent Application Laid-open No. 56-54136, is an apparatus of the type that the temperature characteristics of the light emission and reception elements in the respective transmitter and receiver are retained equal to each other. Also in this case, if the temperatures of environmental atmospheres at the locations of the transmitter and receiver are different from each other, the error in the transmitted signal caused by the temperature difference can not be compensated.

Alternatively, among those apparatuses as used at the location where the atmospheric temperature is subjected to an abrupt change, there is known in the art a signal transmission apparatus as disclosed in an Official Gazette of Japanese Patent Application Laid-open No. 56-12143. In the apparatus, a signal to be transmitted is frequency-converted and a first frequency signal having as a reference the center frequency of the frequency-converted signal is transmitted via an optical fiber to the receiver. In addition, a second frequency signal which is the center frequency of the reference is transmitted via another optical fiber to the receiver. In this case, two light emission elements and two light reception elements respectively connected to the two different optical fibers must have the same temperature characteristics. However, light emission and reception elements with the same temperature characteristics require very cumbersome processes in manufacturing.

SUMMARY OF THE INVENTION

It is an object of the present invention to provide a light signal transmission/reception system which can improve the transmission precision of a signal with a simple construction.

The features of the present invention reside in the provision of: at the side of a transmitter for transmitting by converting an electrical signal into a light signal, means for inserting or substituting predetermined different levels reference pulse signals for portions of the electrical signal, and at the side of a receiver, means for deriving the amount of change in the reference pulse signals; means for compensating for the magnitude of a received signal in accordance with the amount of the change, and means for removing the reference pulse signals from the compensated and received signal.

BRIEF DESCRIPTION OF THE DRAWINGS

FIGS. 7A to 7E show waveforms illustrating the signal conditions at various sections of the embodiment of FIG. 3;

FIG. 8 is a graph showing the relation between current flowing through the light emission diode of FIG. 3 and the amount of light emission of the diode;

DESCRIPTION OF THE PREFERRED EMBODIMENTS

Figure 1:
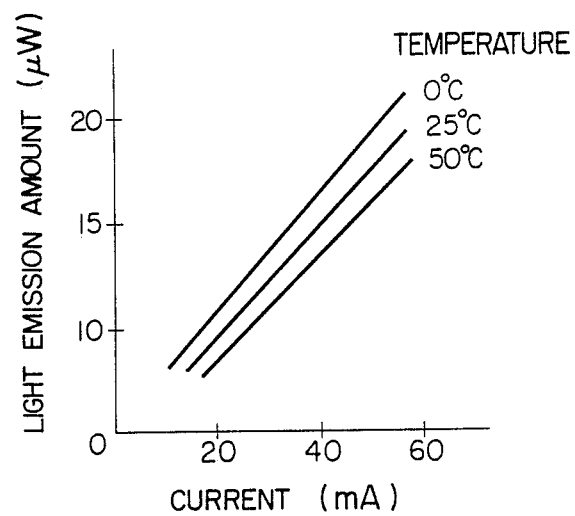
FIG. 1 is a graph illustrating the temperature characteristics of a light emission diode.
Figure 2:
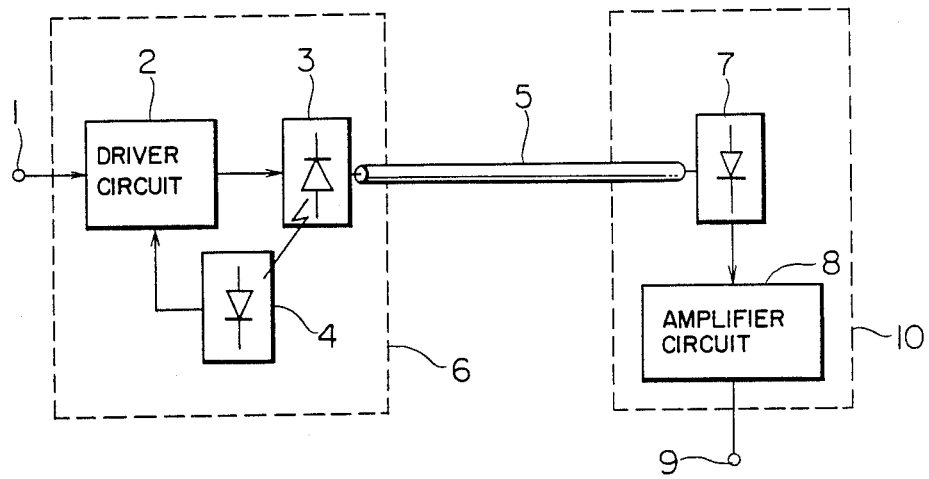
FIG. 2 is a system diagram of a conventional light signal transmission apparatus.

A preferred embodiment of the present invention will be described with reference to FIG. 3. A transmitter 6 and a receiver 10 is coupled through an optical fiber cable 5.

The transmitter 6 comprises a driver circuit 2, light emission diode 3, switch 11, and controller 37. The switch 11 has contacts 44, 45 and 46, and a movable contact 47. The contact 46 is connected to a terminal 1 serving as a signal input terminal for the transmitter 6. The contact 44 is grounded through a power source 12 for a reference voltage $E_0$. The contact 45 is grounded through a power source 13 for a reference voltage $E_1$. The reference voltage $E_0$ is set at a lower value than the minimum value of an input signal to be applied to the terminal 1, while the reference voltage $E_1$ is set at a higher value than the maximum value of the above input signal. The movable contact 47 is connected to the positive terminal of an amplifier 14 of the driver circuit 2. The driver circuit 2 includes an amplifier 14 and transistor 43. The output terminal of the amplifier 14 is coupled to the base of the transistor 43 of which the emitter is connected to the negative terminal of the amplifier 14 and grounded through a resistor 15. The collector of the transistor 43 is coupled to the cathode of the light emission diode 3 of which the anode is connected to a power supply terminal 16. The optical fiber cable 5 transmits a light signal outputted from the light emission diode 3. Numeral 37 represents a controller for controlling the connection states between the movable contact 47 and contacts 44, 45, and 46.

The receiver 10 comprises a light reception diode 7, amplifier circuit 8, filter circuit 25, pulse detection circuit 31, signal processor circuit 32, and abnormality detection circuit 40. The receiver 10 is placed at a position remote from the transmitter 6.

The light reception diode 7 to which a light signal from the optical fiber cable 5 is inputted has its cathode connected through a resistor 18 to a power supply terminal 19. The anode of the light reception diode 7 is connected to a resistor 100 and a resistor 20 in the amplifier circuit 8. The amplifier circuit 8 includes a switch 17, amplifier 21, and switch 24. The switch 17 has a movable contact 48 and other n (n is positive integer, n>1) contacts $Sa_1$ to $Sa_n$. The contacts $Sa_1$ to $Sa_n$ are grounded through respective resistors $Ra_1$ to $Ra_n$. The values of resistance of the resistors $Ra_1$ to $Ra_n$ increase as the suffix number becomes larger. The resistor 20 is connected to the negative terminal of the amplifier 21. Resistor 100 is for converting the output current of the light reception diode 7 into the corresponding voltage. Resistor 101 in association with the resistors $Ra_1$ to $Ra_n$ is for supplying a bias voltage to the amplifier 21. Numeral 102 represents a power supply terminal. The positive terminal of the amplifier 21 is connected to the resistor 101 and to the movable contact 48 of the switch 17. The negative terminal of the amplifier 21 is connected through resistors $Rb_1$ to $Rb_n$ to contacts $Sb_1$ to $Sb_n$ of the switch 24. Also the resistance values of the resistors $Rb_1$ to $Rb_n$ increase as the number n becomes larger. Movable contact 49 of the switch 24 is connected to the output terminal of the amplifier 21. The output terminal of the amplifier 21 is coupled to a resistor 26 of the filter circuit 25.

The filter circuit 25 is a high frequency-cut circuit and comprises, for example, resistors 26 and 28, amplifier 27, and capacitor 29. The resistor 26 is connected to the negative terminal of the amplifier 27 of which the positive terminal is connected to ground. The resistor 28 and capacitor 29 are arranged in parallel, both being connected between the negative and output terminals of the amplifier 27. The output terminal of the amplifier 27 is coupled to a terminal 9.

Figure 4:
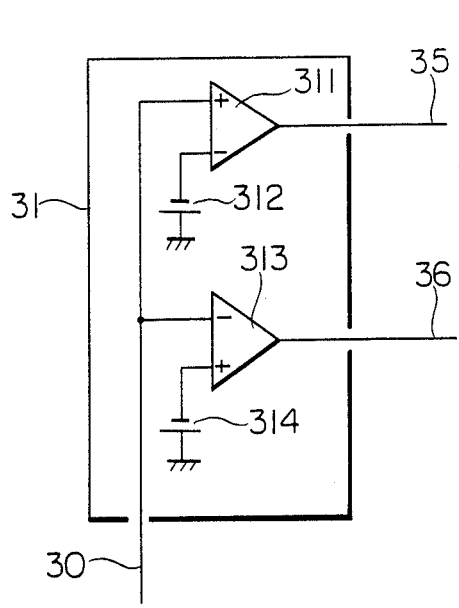
FIG. 4 is a detailed circuit diagram of the pulse detection circuit of FIG. 3.

The arrangement of the pulse detection circuit 31 will be described with reference to FIG. 4. The pulse detection circuit 31 includes a pair of comparators 311 and 313. The negative terminal of the comparator 313 and the positive terminal of the comparator 311 are connected to the movable contact 49 of the switch 24. The negative terminal of the comparator 311 is grounded through a power source 312 having a reference voltage $(-E_0')$, while the positive terminal of the comparator 313 is grounded through a power source 314 having a reference voltage $(-E_1')$.

Figure 5:
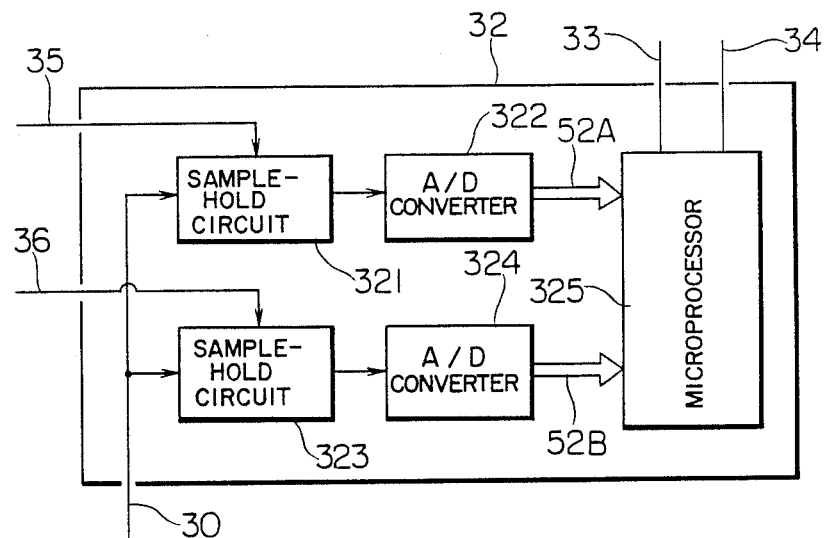
FIG. 5 is a detailed system diagram of the signal processor circuit of FIG. 3.

FIG. 5 shows in detail the signal processor circuit 32. The signal processor circuit 32 comprises sample-hold circuits 321 and 323, analog-digital converters 322 and 324, and microprocessor 325. The sample-hold circuit 321 is coupled to the output terminal of the comparator 311 of the pulse detection circuit 31 and to the output terminal of the dc amplifier 21 of the amplifier circuit 8. The sample-hold circuit 323 is connected to the output terminal of the comparator 313 of the pulse detection circuit 31 and to the output terminal of the dc amplifier 21 of the amplifier circuit 8. The sample-hold circuit 321 is connected to the microprocessor 325 through the analog-digital converter 322, while the sample-hold circuit 323 is connected to the microprocessor 325 through the analog-digital converter 324.

Figure 6:
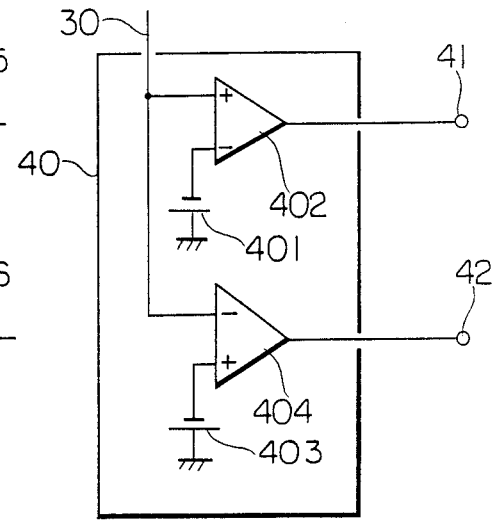
FIG. 6 is a detailed circuit diagram of the abnormality detection circuit of FIG. 3.

FIG. 6 shows a circuit arrangement of the abnormality detection circuit 40. The abnormality detection circuit 40 also includes a pair of comparators 402 and 404. The negative terminal of the comparator 404 and the positive terminal of the comparator 402 are coupled to the output terminal of the amplifier 21 of the amplifier circuit 8. The negative terminal of the comparator 402 is grounded through a power source 401 having a reference voltage $(-E_2)$, while the positive terminal of the comparator 404 is grounded through a power source 403 having a reference voltage $(-E_3)$ The values of the reference voltages are set as $E_2 < E_0$ and $E_3 > E_1$. The output terminal of the comparator 402 is connected to a terminal 41, while the output terminal of the comparator 404 is connected to an analog terminal 42.

Next, the operation of the above embodiment will be described. An output signal (for instance, an analog signal 50 of FIG. 7A) from a detector (not shown) mounted at an analog plant is applied to the terminal 1. The controller 37 cyclically connects the movable contact 47 of the switch 11 to the contacts 46, 44, 45, and 46 in this order. It is noted here that the connection time periods while the movable contact 47 under control of the controller 37 is being connected to each contact are set as in the following for example. The analog time period while the movable contact 47 is connected to either the contact 44 or 45 is from several ns to several tens ns. The time period (first time period) during which the movable contact 47 becomes separated from the contact 44 and connected to the contact 45 is several µs. In addition, a time period (second time period) during which the movable contact 47 becomes separated from the contact 45 and thereafter connected to the contact 46 is, for example, from several tens sec. to several minutes. With such time periods, the movable contact 47 is controlled to connect to each contact of the switch 11. The second time period may be set to have a longer time period than that above described.

In the case that the movable contact 47 is being connected to the contact 46, the analog signal (electrical signal) 50 shown in FIG. 7A and inputted to the terminal 1, is directly inputted to the amplifier 14. In the case that the movable contact 47 is being connected to the contact 44, instead of a signal 50 a signal $P_0$ corresponding to the reference voltage $E_0$ of the power source 12 is inputted to the amplifier 14. Alternatively, in the case that the movable contact 47 is being connected to the contact 45, instead of a signal 50 a signal $P_1$ corresponding to the reference voltage $E_1$ of the power source 13 is inputted to the amplifier 14. By controlling the contact state of the movable contact 47 by means of the controller 37 having the above described operational function, a signal 51 shown in FIG. 7B is derived out of the switch 11 and inputted to the amplifier 14. The signals $P_0$ and $P_1$ become of a pulse shape as shown in FIG. 7B since the connection time periods of the movable contact 47 to the contacts 44 and 45 are very short. The signals $P_0$ and $P_1$ are herein referred to as reference pulse. The period of the respective reference pulses on the signal 51 is T. Pulses $P_0'$ and $P_1'$ of FIG. 7B are signals respectively coresponding to the power sources 12 and 13 and derived from the switch 11 prior to the pulses $P_0$ and $P_1$. Assuming that the maximum input range of the analog signal 50 is within $V_H-V_L$, the reference voltage $E_1$ is so set as the value of the signal 30 $P_0$ becomes larger than the maximum value $V_H$ of the analog signal 50, while the reference voltage $E_0$ is so set as the value of the signal $P_0$ becomes smaller than the minimum value $V_L$ of the analog signal 50. The width of each of the above reference pulses is extraordinarily narrow as compared with the period T of the signal 50 and is in the order of several ns to several tens ns.

The output from the switch 11, or signal 51 (voltage signal) is subjected to a voltage-current conversion at the driver circuit 2. The driver circuit 2 outputs to the light emission diode 3 a current signal corresponding to the signal 51.

The light emission diode 3 is used in the range where the amount of light emission and its current are in proportion to each other, as shown in FIG. 8. $I_0$, $I_L$, $I_H$, and $I_1$ represent the values after being subjected to a voltage-current conversion at the driver circuit 2 and respectively correspond to $E_0$, $V_L$, $V_H$, and $E_1$ of the signal 51. $E_0$ and $E_1$, i.e., $I_0$ and $I_1$ are both set within the range where the current-light conversion in the light emission diode 3 has a proportional relation. The output from the driver circuit 2 where the signal 51 was subjected to a voltage-current conversion is inputted to the light emission diode 3, thereby outputting a light signal corresponding to the signal 51 to the optical fiber cable 5. The light signal has also the reference pulses.

The light reception diode 7 converts the light signal passed through the optical fiber cable 5 into a corresponding current signal. With the current flowing through the light reception diode 7, a voltage signal generated in association with the resistor 100 is inputted through the resistor 20 to the dc amplifier 21. The output from the dc amplifier 21, or signal 30 is an inverted signal of the waveform of the signal 51, as shown in FIG. 7C. The signal 30 corresponds (as described above, has an inverted sign) to the signal 51 and includes the reference pulses $P_0$ and $P_1$, and so on. However, the voltages of the reference pulse signals $P_0$ and $P_1$ of the signal 30 are $Y_0$ and $Y_1$, respectively, which differ in magnitude from the voltages $E_0$ and $E_1$ of the reference pulse signals $P_0$ and $P_1$ of the signal 51. The reasons why the voltages for the reference pulse signals $P_0$ and $P_1$ differ at the sides of transmitter 6 and receiver 10 are attributable to the influences from: the difference of atmospheric temperature conditions at the locations where the light emission and reception diodes 3 and 7 are mounted; the change in aging of the light emission diode 3, optical fiber cable 5, and light reception diode 7; the difference of connection conditions among the light emission and reception diodes 3 and 7 and the optical fiber cable 5; and the like.

The output of the amplifier 21, or signal 30 is transferred to the filter circuit 25, pulse detection circuit 31, signal processor 32, and abnormality detection circuit 40.

The pulse detection circuit 31 is for detecting the reference pulses of the signal 30. The signal 30 has an inverted sign as of the signal 51, as shown in FIG. 7C. Therefore, in order to detect the reference pulses of the signal 30, the power sources 312 and 314 are so made to have negative values as described above. $E_0'$ and $E_1'$ are set so as to suffice the following conditions of the unequalities (1).

$$\left. \begin{array}{l} V_L > E_0' > E_0 \\ V_H < E_1' < E_1 \end{array} \right\} \quad (1)$$

With $E_0'$ and $E_1'$ set as above, since the signal inputted to the terminal 1 does not exceed over the maximum input range, the pulse detection circuit 31 can always detect the reference pulses. As a result, the comparators 311 and 313 output signals 35 and 36 of a pulse shape, respectively, as shown in FIG. 7D and FIG. 7E.

The signal 35 outputted from the pulse detection circuit 31 is inputted to the sample-hold circuit 321 of the signal processor circuit 32, while the signal 36 is inputted to the sample-hold circuit 323, respectively. The signal 30 is inputted to both sample-hold circuits 321 and 323. The sample-hold circuit 321 holds the level of the signal 30 inputted at the time when a pulse of the signal 35 is inputted, thus, the level ($-Y_0$) of the reference pulse signal $P_0$ of the signal 30 is held by the sample-hold circuit 321. Alternatively, the sample-hold circuit 323 holds the level of the signal 30 inputted at the time when a pulse of the signal 36 is inputted, thus, the level ($-Y_1$) of the the reference pulse signal $P_1$ of the signal 30 is held by the sample-hold circuit 323. Here, the reference pulse signals of the signal 51 are not subjected to distortion in the waveforms due to the broad frequency band width of the optical fiber cable 5. Therefore, the waveforms of the reference pulse signals are inputted as they are to the sample-hold circuits 321 and 323, causing no error in transferring signals.

The levels ($-Y_0$, and $-Y_1$) of the reference pulse signals $P_0$ and $P_1$ held with the sample-hold circuits 321 and 323 are inputted to the analog-digital converters 322 and 324 and converted with the converters into digital signals 52A and 52B. These digital signals are fed into the microprocessor 325.

The relation between $E_0$, $E_1$, $Y_0$, and $Y_1$ can be represented by the equations (2). In the equations (2), the values of $Y_0$ and $Y_1$ are shown using an absolute value.

$$\left.\begin{array}{l} Y_0 = KE_0 + b \\ Y_1 = KE_1 + b \end{array}\right\} \quad (2)$$

wherein K and b are constants varying with the changes in temperature and in aging of signal transference paths and varying slowly with time. The constant K contains the components in association with the changes of temperature and in aging, while b contains the components in association with the change in aging. Both $Y_0$ and $Y_1$ are shown by a function of K and b. The reason for this is that the time duration between the reference pulse signals $P_0$ and $P_1$ is very short. For example, by setting this time duration at several μs, it can be considered that the factors of the characteristic change are the same for both reference pulse signals $P_0$ and $P_1$. As described above, since K and b varies slowly with time, the timing T for applying the reference pulse signals $P_0$ and $P_1$ shown in FIG. 7B may be set compatible with the variation rates of the constant K and b, for example, at from several seconds to several minutes. The values of $E_0$ and $E_1$ are known values which have previously been set in the power sources 12 and 13 of the transmitter 6. The values of $Y_0$ and $Y_1$ are measured as described above at the sample-hold circuits 321 and 323. These values are used in order to solve the constants K and b from the equations (2).

The microprocessor 325 has the values of $E_0$ and $E_1$ in memory. The microprocessor is supplied with the signals 52A and 52B, i.e., the outputs from the analog-digital converters 322 and 324, indicative of the levels of the reference pulse signals $P_0$ and $P_1$, and solves the values of K and b in accordance with the equations (2). Upon calculation of the changes of the values from those at an initial condition (the state at which the signal level transmitted from the transmitter 6 becomes equal to the signal level received at the receiver 10), for the changed value of K a gain adjustment signal 33 is outputted for changing over the movable contact 49 of the switch 24, while for the changed value of b a bias adjustment signal 34 is outputted for changing over the movable contact 48 of the switch 17. The resistors $Rb_1$ to $Rb_n$ are for adjusting the gain, while the resistors $Ra_1$ to $Ra_n$ are for adjusting the bias. Thus, the movable contact 49 of the switch 24 is connected in accordance with the gain adjustment signal 33 to a contact $Sb_n$ to which a definite resistor $Rb_n$ for compensating for the change of K is connected. The movable contact 48 of the switch 17 is connected in accordance with the bias adjustment signal 34 to a contact $Sa_n$ to which a definite resistor $Ra_n$ for compensating for the change of b is connected.

As stated above, basing upon the reference pulse signals added onto the signal 50 transmitted from the transmitter 6, and basing upon the reference pulse signals of the signal 30 received at the receiver 10, selected are a suitable gain adjustment resistor and a bias adjustment resistor. Therefore, it is possible to make, with ease, the levels (absolute values) of the reference pulse signals $P_0$ and $P_1$ of the signal 30 coincide with the level (absolute values) of the reference pulse signals $P_0$ and $P_1$ of the signal 51. That is, the absolute values of the levels of the respective signals 30 and 51 become identical. Afterwards from that time, even if the atmospheric temperature conditions at the locations where the transmitter 6 and the receiver 10 are mounted happen to vary independently from each other, or even if the change in aging of the optical fiber cable 5 occurs, on all such occasions, by virtue of the operations of the pulse detection circuit 31, signal processor circuit 32, and switches 17 and 24, the absolute values of the levels of the signals 30 and 51 can be adjusted to become equal.

The signal 30 corrected so as to have the same level (absolute value) of the signal 51 is inputted to the filter circuit 25. The filter circuit 25 is a high frequency-cut circuit as above described so that the reference pulse signals $P_0$ and $P_1$ contained in the signal 30 are removed therefrom. Therefore, the identical analog signal to the signal 50 is outputted at the terminal 9. The output at the terminal 9, for example, is inputted to a central computer so as to use the output as data for the operations performed for monitoring or controlling.

The abnormality detection circuit 40 outputs a signal from the terminal 41 or 42 to the computer, the signal being indicative of the abnormal state that the input signal 30 is either smaller than $E_2$ or larger than $E_3$. In this case, it means that the transmission apparatus is in an abnormal state. When the signal indicative of the abnormal state is inputted to the computer via the terminal 41 or 42, the signal outputted from the terminal 9 at that time is considered as abnormal and is interrupted to be inputted to the computer.

As seen from the above description of the embodiment, basing upon the reference pulse signals contained in the signal transmitted from the transmitter and the reference pulse signals contained in the signal received with the receiver, the received signal is corrected. The temperature compensation for the change in the temperature difference between the atmospheric temperatures at the locations where the light emission and reception diodes are mounted; the compensation for the change in aging of the light emission diode, optical fiber cable, and light reception diode; and the compensation for the change in drift and bias of the electric circuits of the transmitter, can all be achieved. Therefore, in the present embodiment, the precision in signal transmission can be remarkably improved. Even if the temperature characteristics of the light emission and reception diodes are different, it is possible to obtain a high transmission precision. Furthermore, the circuit arrangement necessary for the compensation for the received signal is also very simple. In addition, the number of optical fiber cables required for the transmission of the signal from a one transmitter to a one receiver is single without necessitating another cable for transmitting a reference signal as in the case described in the Official Gazette of Japanese Patent Application Laid-open No. 56-12143. Therefore, the transmission apparatus itself of the present embodiment is very simple in construction.

Instead of the switches 17 and 24 described in the above embodiment, a function generator may be used which is separately supplied with the bias adjustment signal 34 and gain adjustment signal 33 to output definite bias and gain.

In the Official Gazette of Japanese Patent Application Laid-open No. 55-135441, another method is disclosed in which a dc reference signal is superposed upon an analog signal at the side of the transmitter, a dc component of the received signal at the side of the receiver is compared with another dc reference signal to thereby control the analog signal. This method is to superpose a dc reference signal and is not of the kind that two reference signals ($P_0$ and $P_1$) as for the present invention are used. Therefore, the above equations (2)

can not be solved. In particular, this known method can perform only a bias adjustment and differs from the method according to the present invention which makes it possible to carry out both gain and bias adjustments.

Figure 3:
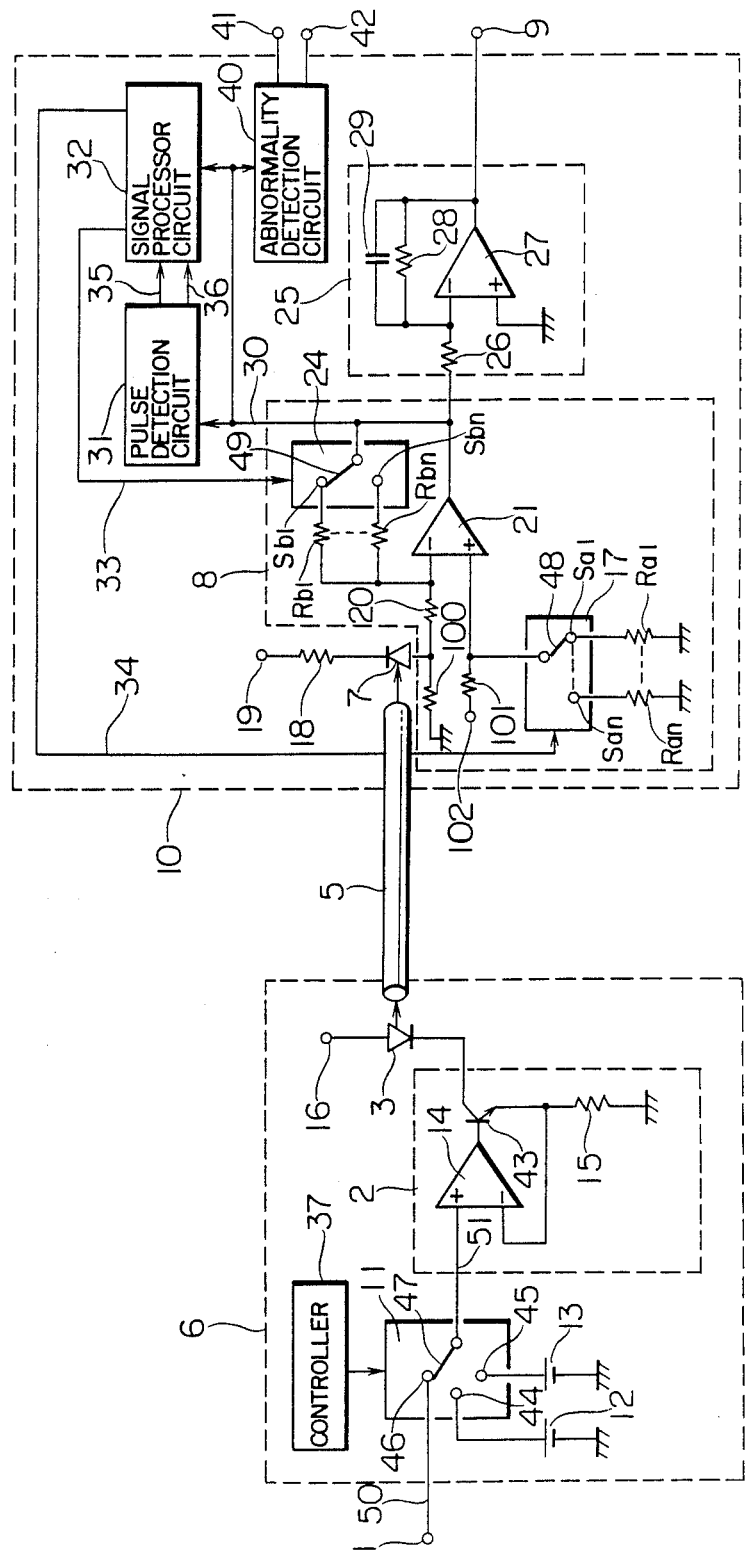
FIG. 3 is a schematic circuit diagram of a light signal transmission apparatus of a preferred embodiment according to the present invention.

The description will be given to the case that the above embodiment of FIG. 3 is applied to a nuclear reactor plant. In this case, respective detectors for detecting, such as pressure, temperature, flow rate, and the like are provided at the nuclear reactor. The transmitter 6 supplied with signals from such detectors is mounted at the working site (where radioactivity is vigorous) in the nuclear reactor house. The receiver 10 coupled to the optical fiber cable 5 is mounted at the central operation room where radioactivity is not active. A plurality of terminals 9 of the receiver 10 are connected to the central computer mounted at the central operation room, the computer executing calculations using the received signals. The calculated results serving as monitoring data are displayed on a control panel provided at the central operation room. Further, signals inputted from the control panel by the operator and the outputs from the computer are transmitted from the receiver 6 mounted at the central operation room to the receiver 10 mounted at the working site in the nuclear reactor house. The outputs from the receiver 10 are transferred to the control-object equipments of the nuclear reactor plant so as to attain necessary controls. The temperature at the working site in the nuclear reactor house and the temperature at the central operation room differ from each other (normally, the former is higher), and moreover the transmitter or receiver at the working site is under the influence of radioactive rays. Even in this case, according to the present embodiment, the received signal can be compensated at the receiver side as shown in the embodiment shown in FIG. 3.

Figure 9:
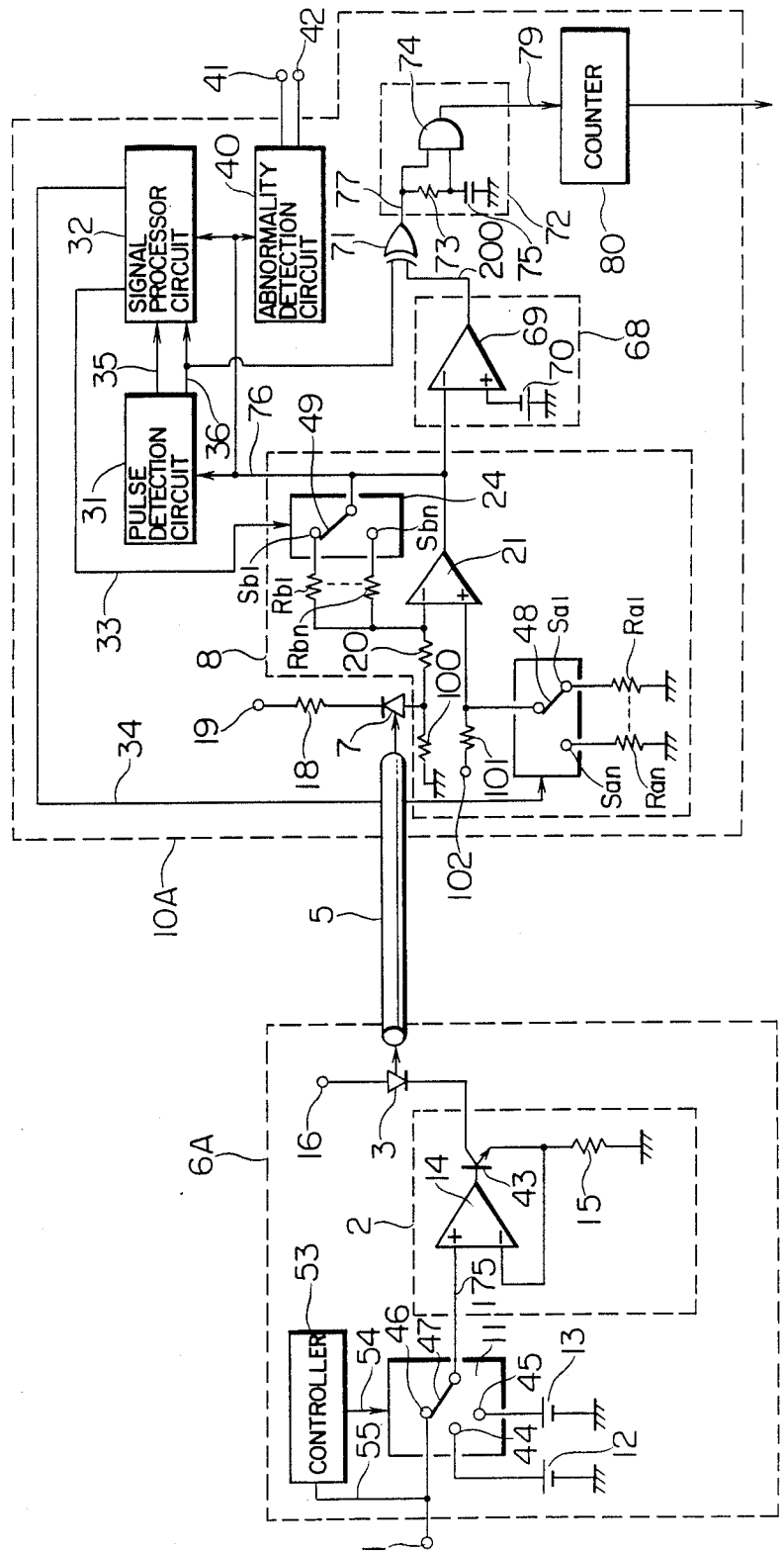
FIG. 9 is a schematic circuit diagram of another embodiment according to the present invention.

Although the embodiment shown in FIG. 3 has been directed to the analog signal transmission, the present invention is also readily applicable to the digital signal transmission. An embodiment applied to the digital signal transmission will be described with reference to FIG. 9. Only those portions different from the embodiment of FIG. 3 will be discussed. In the figures associated with the embodiment, identical constitutional elements have been designated with the same numbers as those of the first embodiment.

A transmitter 6A comprises a driver circuit 2, light emission diode 3, switch 11, and controller 53. The transmitter 6A uses the controller 53 in place of the controller 37 of the transmitter 6.

Figure 10:
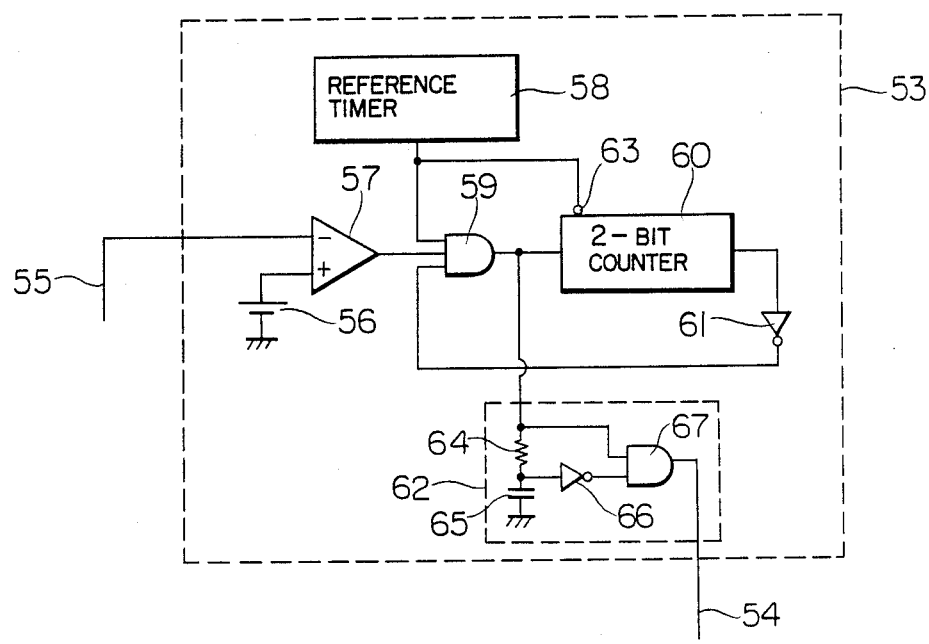
FIG. 10 is a detailed schematic circuit diagram of the controller 53 of FIG. 9.

The controller 53, as shown particularly in FIG. 10 includes a comparator 57, reference timer 58, 2-bit counter 60, and pulse width adjustment circuit 62. A terminal 1 is connected to the negative terminal of the comparator 57 of which the positive terminal is grounded through a power source 56 having a reference voltage Es. The output terminal of the comparator 57 is connected to an AND gate 59. The output terminal of the AND gate 59 is coupled to the 2-bit counter 60. The reference timer 58 is coupled to the input terminal of the AND gate 59 and to a clear terminal 63 of the 2-bit counter 60. The 2-bit counter 60 is connected via an inverter 61 to another input terminal of the AND gate 59.

The pulse width adjustment circuit 62 comprises a resistor 64, capacitor 65, inverter 66 and AND gate 67. The output terminal of the AND gate 59 is grounded via the resistor 64 and capacitor 65. In addition, the output terminal of the AND gate 59 is connected to one of the input terminals of the AND gate 67. The other of the input terminals of the AND gate 67 is connected to the resistor 64. The output from the pulse width adjustment circuit 62 of the controller 53, that is, the output (signal 54) from the AND gate 67, becomes a change-over control signal for a movable contact 47 of the switch 11.

A receiver 10A includes a light reception diode 7, amplifier circuit 8, pulse detection circuit 31, signal processor circuit 32, abnormality detection circuit 40, discriminator circuit 68, and filter circuit 72. The receiver 10A is that in which the filter circuit 25 is replaced by the discriminator circuit 68 and the filter circuit 72 in the receiver 10.

The discriminator circuit 68 includes a comparator 69. The negative terminal of the comparator 69 is coupled to the output terminal of a dc amplifier 21. The positive terminal of the comparator 69 is grounded through a power source 70 having a reference voltage $(-E_L)$. The output terminal of the comparator 69 and the output terminal of a comparator 313 of the pulse detection circuit 31 are connected to the input terminal of an EOR gate 71. The output terminal of the EOR gate 71 is grounded through a resistor 73 and a capacitor 75. The output terminal of the EOR gate 71 is connected to one input terminal of an AND gate 74, and the resistor 73 is coupled across a pair of the input terminals of the AND gate 74.

Figure 11:
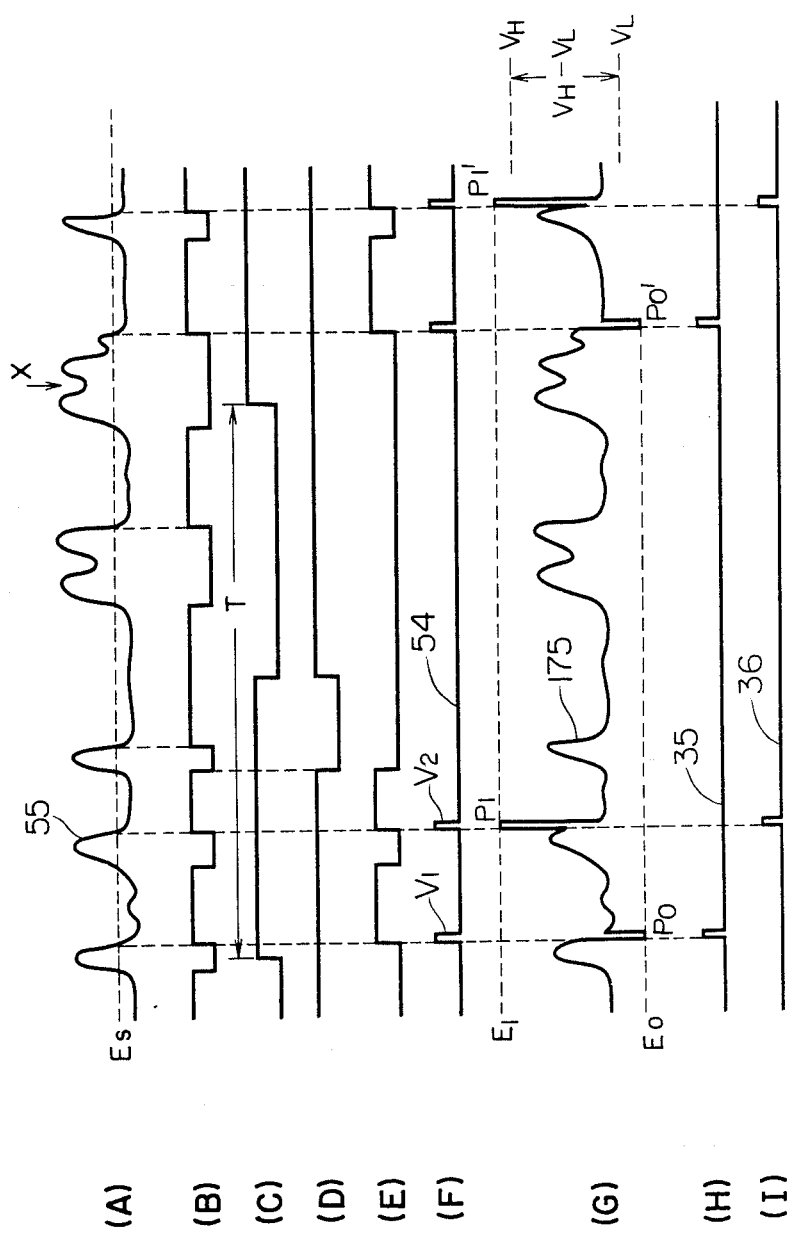
FIGS. 11 and 12 show waveforms illustrating the signal conditions at various sections of the embodiment of FIG. 9.

The terminal 1 is connected for example to a radioactive ray monitor mounted at a nuclear reactor plant. The transmitter 6A is disposed within a nuclear reactor house. Thus, a linear pulse signal 55 shown in FIG. 11(A) is inputted to the terminal 1. The signal 55 is transferred to a contact 46 and inputted to the comparator 57 of the controller 53. The comparator 57 outputs a pulse while the level of the signal 55 becomes lower than the reference voltage $E_S$ of the power source 56. Therefore, the comparator 57 derives a signal shown in FIG. 11(B) in response to the signal 55. The reference timer 58 continuously outputs pulses with a constant period T as shown in FIG. 11(C). The reason why the reference pulse signal is superposed while the level of the signal 55 becomes lower than the reference voltage $E_S$, is as follows. If a reference pulse signals is inserted at the point X shown in FIG. 11(A), the pulses appearing before and after the point X becomes a continuous one due to the inserted reference pulse. Therefore, the pulses appearing before and after the point X can not be discriminated as separated ones. To avoid this, the reference pulse signal is inserted at the lower level than $E_s$.

The 2-bit counter 60 counts its input signal while the input signal (an output signal from the reference timer 58) to the clear terminal 63 is at a logic "1", and resets its output while the input signal to the clear terminal 63 is at a logic "0". Therefore, the 2-bit counter takes a count mode while the output signal from the reference timer 58 is "1". Then, the 2-bit counter 60 outputs a logic "1" when it counted up two input signal pulses. As a result, the inverter 61 outputs a signal shown in FIG. 11(D). And so, the AND gate 59 outputs a signal shown in FIG. 11(E). Although the signal of FIG. 11(E) may directly be transferred to the switch 11 in order to use the signal as a change-over control signal of the movable contact 47, in order to apply the equations (2) the pulse width must be made narrower. To this end, the output from the AND gate 59, or signal shown in FIG. 11(E) is inputted to the pulse width adjustment circuit 62. The pulse width is determined by the values of the resistor 64 and capacitor 65. The output from the pulse width adjustment circuit 62, i.e., signal 54 is shown in FIG. 11(F). The signal 54 is in the shape of a pair of pulses $V_1$ and $V_2$. The time duration between the pulses $V_1$ and $V_2$ is in the order of several ns to several hundreds ns. The signal 54 has such pairs of pulses $V_1$ and $V_2$ at a period of T.

The switch 11 is supplied with the signal 54 and actuated in such a manner that the movable contact 47 is connected to a contact 44 for the input of the pulse $V_1$ of the signal 54; the movable contact 47 is connected to a contact 45 for the pulse $V_2$; and the movable contact is connected to the contact 46 for the portions other than the pulses $V_1$ and $V_2$ of the signal 54. Therefore, a signal 175 inputted to the driver circuit 2 becomes such a signal as the signal 55 with the reference pulse signals $P_0$ and $P_1$ injected, as shown in FIG. 11(G). The level of the reference pulse signal $P_0$ is $E_0$, while the level of the reference signal $P_1$ is $E_1$. The reference pulse signal $P_0$ is smaller than the minimum input value $V_L$ of the signal 55. Further, the reference pulse signal $P_1$ is larger than the maximum input value $V_H$ of the signal 55. $V_H$-$V_L$ indicates the maximum input range. The signal 55 is converted into a light signal at the light emission diode 3 and transmitted through an optical fiber cable 5 to the receiver 10A at a central operation room.

The signal 55 is converted at the light reception diode 7 into a current signal which in association with a resistor 100 is transformed into a voltage signal to be supplied to the dc amplifier 21. In the present embodiment, as similar to the embodiment of FIG. 3, the sign of the signal 175 is inverted at the dc amplifier 21 and the inverted signal is outputted therefrom (the output signal corresponds to a signal 76). The levels of the reference pulse signals $P_0$ and $P_1$ of the output signal from the dc amplifier 21 are assumed to take $Y_0$ and $Y_1$ as is similar for the embodiment of FIG. 3. The pulse detection circuit 31 is supplied with the output, i.e., signal 76, from the dc amplifier 21, so that a comparator 311 outputs a signal 35 (FIG. 11(H)) corresponding to the reference pulse signal $P_0$ and a comparator 313 outputs a signal 36 (FIG. 11(I)) corresponding to the reference pulse signal $P_1$, respectively.

The signal processor circuit 32 has the same function as of the signal processor circuit 32 of the embodiment of FIG. 3. The signal processor circuit 32 is supplied with the signals 35 and 36 and a microprocessor 325 functions to solve the constant K and b from the equations (2). Calculations are performed as to to what extent the constants changed from the initial conditions. Then, a movable contact 49 of a switch 24 is connected to a suitable contact $Sb_n$ in accordance with the change of the constant K. In addition, a movable contact 48 of a switch 17 is connected to a suitable contact $Sa_n$ in accordance with the change of b. With such connections, the levels (absolute values) of the reference pulse signals $P_0$ and $P_1$ of the signal 76 are made to coincide with $E_0$ and $E_1$, respectively. The signal 76 (refer to FIG. 12(A)) with the level-compensated reference pulse signals $P_0$ and $P_1$ is outputted from the dc amplifier 21.

Figure 12:
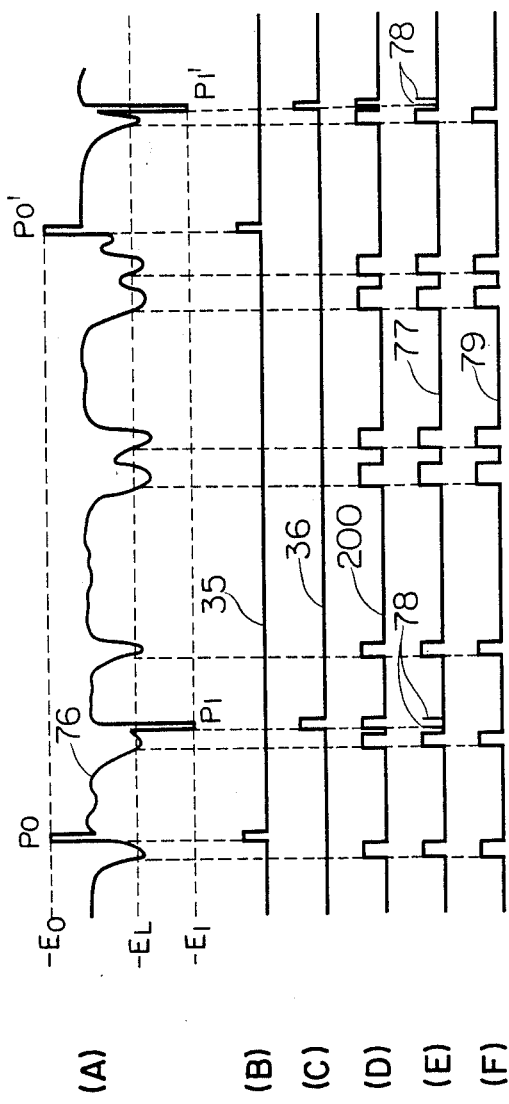

The compensated signal 76 of FIG. 12(A) is inputted to the discriminator circuit 68. The discriminator circuit 68 detects the pulses of the signal 76 having lower values (because of the inverted signal) than the reference level ($-E_L$). The signal of FIG. 12(D) corresponds to the output of the discriminator circuit 68. The output signal 200 from the discriminator circuit 68 and a signal 36 are inputted to the EOR gate 71. The EOR gate 71 outputs a signal 77 shown in FIG. 12(E). The signal 77 contains glitch pulses 78. The glitch pulses 78 generate when the pulses of the two input signals to the EOR gate 71 shift in timings. The output of the EOR gate 71, or signal 77 is inputted to the filter circuit 72. The filter circuit 72 removes the glitch pulses of the signal 77 to output a signal 79 as shown in FIG. 12(F). The signal 79 is inputted to the counter 80. The counter 80 counts the pulses of the signal 79. The number of pulses per unit time indicates the intensity of radioactive rays. The output from the counter 80 is inputted to a computer at a central operation room, or it is displayed on a display of a control panel.

Also, in the above embodiment, similar effects to those for the previous embodiment can be obtained. In addition, a linear pulse signal can be transmitted with a good precision.

According to the present invention, the possible influences from the temperature difference between the atmospheres at the locations where the receiver and transmitter are respectively mounted and from the change in aging of transmission paths, can be compensated with a simple apparatus, and the transmission precision can remarkably be improved.

We claim:

1. A light signal transmission/reception system having a transmitter for converting an electrical signal into a light signal and transmitting said light signal and a receiver for converting said light signal transmitted from said transmitter into an electrical signal comprising: means for substituting a plurality of reference pulse signals with amplitudes of predetermined different levels for any portions of said electrical signal provided at the side of said transmitter; and means provided at the side of said receiver for deriving the amount of change in the amplitude of said reference pulse signals, means for compensating for the magnitude of a received signal by adjusting the gain and the bias of an amplifier circuit in said receiver in accordance with the amount of said change, and means for removing said reference pulse signals from the compensated and received signal, provided at the side of said receiver.

2. A light signal transmission/reception system having a transmitter for converting an electrical signal into a light signal and transmitting said light signal and a receiver for converting said light signal transmitted from said transmitter into an electrical signal comprising: means for substituting reference pulse signals for any portions of said electrical signal provided at the side of said transmitter; and means provided at the side of said receiver for deriving the amount of change in said reference pulse signals, means for compensating for the magnitude of a received signal by adjusting the gain and the bias of an amplifier circuit in said receiver in accordance with the amount of said change, and means for removing said reference pulse signals from the compensated and received signal, provided at the side of said receiver, wherein said means for substituting said reference pulse signals is means for substituting a first reference pulse signal having a larger value than a maximum value of said electrical signal to be transmitted, and a second reference pulse signal having a smaller value than a minimum value of said electrical signal.

3. A light signal transmission/reception system having a transmitter for converting an electrical signal into a light signal and transmitting said light signal and a receiver for converting said light signal transmitted from said transmitter into an electrical signal comprising: means for substituting reference pulse signals for any portions of said electrical signal provided at the side of said transmitter; and means provided at the side of said receiver for deriving the amount of change in said reference pulse signals, means for compensating for the magnitude of a received signal by adjusting the gain and the bias of an amplifieer circuit in said receiver in accordance with the amount of said change, and means for removing said reference pulse signals from the compensated and received signal, provided at the side of said receiver wherein said means for substituting said reference pulse signals is means for substituting said reference pulse signals for a portion of a linear pulse electrical signal to be transmitted, when the level of said portion of a linear pulse electrical signal becomes lower than a predetermined value.

4. A light signal transmission/reception system having a transmitter for converting an electrical signal into a light signal and transmitting said light signal through an optical fiber cable and a receiver for converting said light signal transmitted from said transmitter into an electrical signal;

said transmitter comprising:
  means for substituting reference pulse signals including a first reference pulse signal having a larger value than a maximum value of said electrical signal to be transmitted, and a second reference pulse signal having a smaller value than a minimum value of said electrical signal;

said receiver comprising:

means for deriving the amount of change in said reference pulse signals between the transmitted reference pulse signal and a received reference reference signal;

means for producing a gain adjustment signal and a bias adjustment signal based on the amount of change derived;

amplifier means for amplifying the electrical signal converted from the received light signal, a gain and a bias of said amplifier means being adjusted in accordance with said gain adjustment signal and said bias adjustment signal, respectively, thereby to compensate for a decrease in the magnitude of said converted electrical signal; and means for removing said reference pulse signals from the compensated and received signal.

* * * * *